Dec. 24, 1957 J. C. HAMILTON 2,817,191
FURNACE FOR THE MANUFACTURE OF COLORED GLASS
Filed May 13, 1955 2 Sheets-Sheet 1
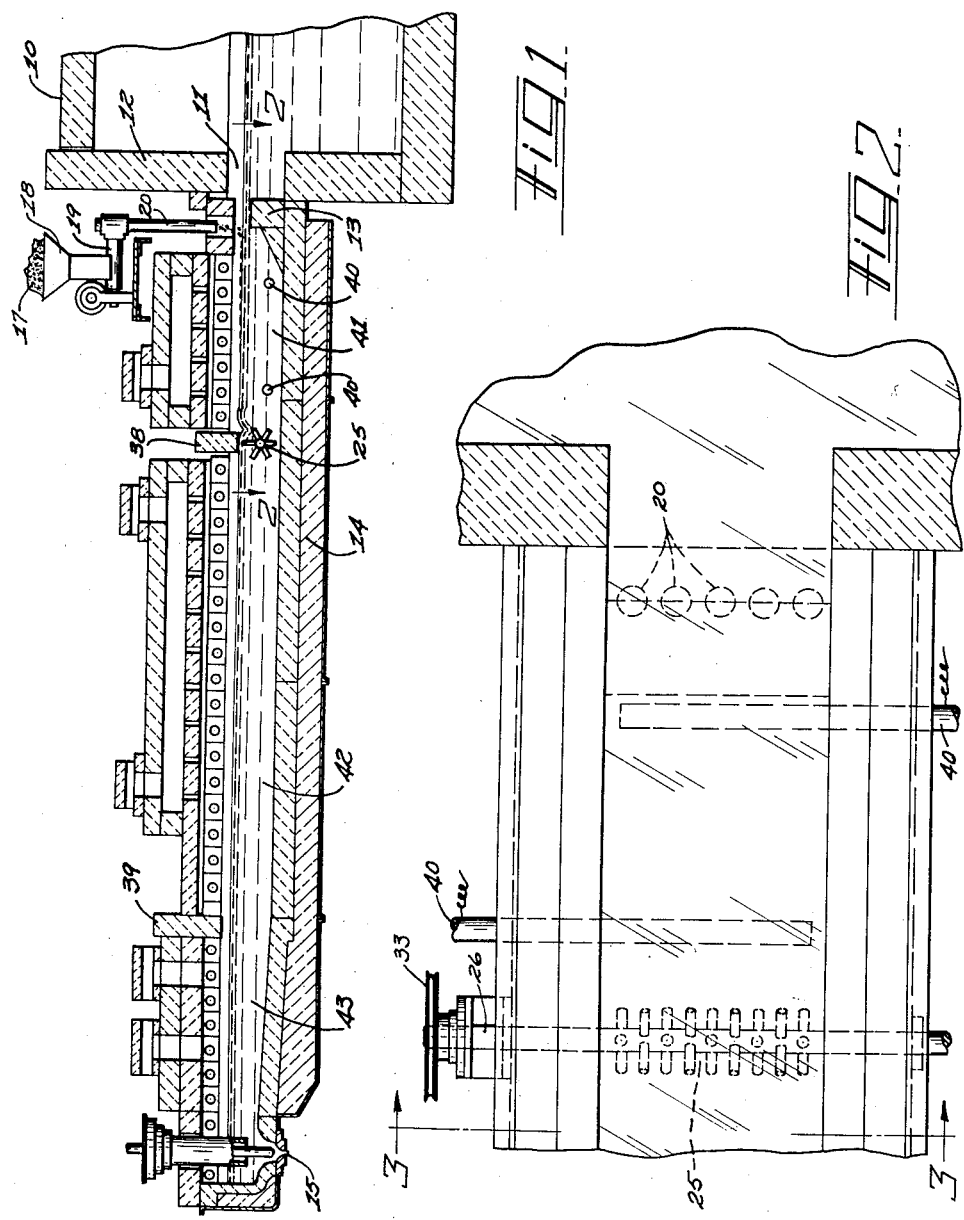
INVENTOR
JOSEPH C. HAMILTON
BY
Rule and Hoge
ATTORNEYS Dec. 24, 1957  J. C. HAMILTON  2,817,191
FURNACE FOR THE MANUFACTURE OF COLORED GLASS
Filed May 13, 1955   2 Sheets-Sheet 2

INVENTOR
JOSEPH C. HAMILTON
BY
Rule and Hoge
ATTORNEYS

United States Patent Office 2,817,191
Patented Dec. 24, 1957

2,817,191

FURNACE FOR THE MANUFACTURE OF COLORED GLASS

Joseph C. Hamilton, Toledo, Ohio, assignor to Owens-Illinois Glass Company, a corporation of Ohio Application May 13, 1955, Serial No. 508,198

3 Claims. (Cl. 49—54)

My invention relates to the manufacture of colored glass and particularly to means for mixing coloring materials with the molten glass. The invention is of use in connection with continuous type glass melting and refining furnaces in which the molten glass flows from the melting and refining tank into a forehearth from which the glass is dispensed.

In the manufacture of colored glass it is old in the art to feed coloring materials into the molten glass as the latter flows from the refining tank into the forehearth. The colorant mingles with the molten glass and is melted thereby and is further mixed with glass in the forehearth by stirring devices. One of the difficulties encountered with the use of such prior art stirring devices is due to the fact the coloring material which is added at the surface of the flowing glass tends to flow in cords along the bottom surface of the forehearth without being uniformly mixed throughout the body of the glass. The prior art stirring mechanisms accomplish only a minor top-to-bottom or bottom-to-top stirring of the glass.

An object of the present invention is to provide a novel form of stirring means within the forehearth which produces a vigorous top-to-bottom and bottom-to-top stirring of the glass by which the colorant is uniformly mixed throughout the body of flowing glass, producing a homogeneous glass of uniform color throughout and free from streaks or cords. For this purpose the invention provides a stirring device comprising a horizontal shaft extending transversely through the forehearth below the glass level and having radially disposed stirring elements connected thereto. The stirring device is driven by a motor and operates to carry surface portions of the glass downwardly through the body of glass and also to carry portions from the bottom of the forehearth upwardly to the surface, in a manner to vigorously stir and thoroughly mix the coloring material therein.

Referring to the accompanying drawings:

Fig. 1 is a longitudinal sectional elevation of a furnace tank and forehearth with the stirring device mounted therein, a portion of the tank being broken away;

Fig. 2 is a part sectional plan view at the line 2—2 on Fig. 1;

Figure 3:
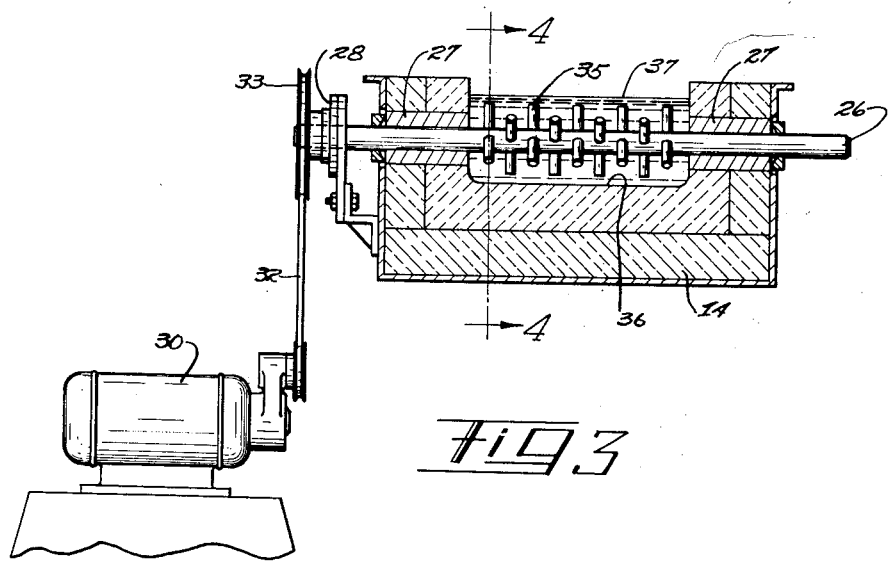
Fig. 3 is a cross section at the line 3—3 on Fig. 2 showing particularly the stirring device.
Figure 4:
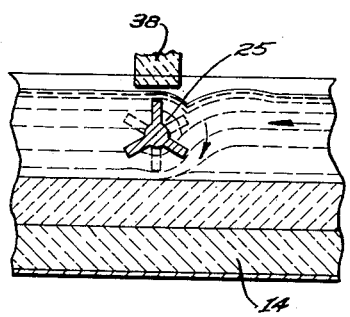
Fig. 4 is a section at the line 4—4 on Fig. 3.

Referring to Fig. 1 the glass batch is melted and refined in a tank 10 and flows from the tank through an outlet 11 in the wall 12 of the tank and over a dam 13 into the forehearth 14. The glass may be further refined and its temperature regulated in a conventional manner as the glass flows through the forehearth to a feeder outlet 15.

Coloring material 17, which may consist of various oxides or other colorants, is placed in a hopper 18. A motor driven feeder 19 feeds and controls the flow of the colorant through a row of vertical tubes 20 extending throughout the width of the forehearth channel. The material 17 is thus delivered into the forehearth where it is distributed over the surface of the moving molten glass throughout the width of the channel so that it is melted and mixed with the glass.

A stirring device 25 is mounted in the forehearth at a position some distance forward of the point at which the colorant is added to the molten glass. The stirring device comprises a horizontal shaft 26 rotatable in bearings 27 in the side walls of the forehearth, the shaft extending perpendicular to the direction of flow to the glass in the forehearth. The bearings 27 may consist of a graphite refractory or water cooled material which provides a seal. Outboard bearings 28 which carry the load are placed at a suitable distance from the seal. The shaft 26 is rotated continuously by a motor 30 which has driving connection with the shaft through speed reduction gearing and a driving belt 32 trained over a pulley 33 keyed to the shaft.

Stirring elements 35 are connected to the shaft 26 and etend radially therefrom. These stirring elements may be in the form of vanes, screws, or blades and may be arranged in staggered relation throughout the length of that portion of the shaft which is immersed in the glass. The shaft is positioned at such level that the stirring elements move in paths extending near the floor level 36 of the forehearth and near the surface 37 of the glass.

The rotation of the stirrer 25 causes the blades or stirring elements 35 to force surface portions of the glass downwardly, carrying such portions to the bottom of the body of glass in the forehearth. The blades also force glass flowing along the bottom surface upwardly to the surface of the glass. The stirrer is driven at a speed to cause a vigorous stirring and intermingling of the entire body of glass flowing through the forehearth. Such stirring may be obtained by rotation of the stirrer in either direction.

Damper or skimmer blocks 38 and 39 extend down through the roof of the forehearth and through the width thereof to a point just above the glass level to provide thereby temperature control chambers 41, 42, and 43. These damper blocks may extend into the glass if so desired to thereby regulate the passage of the glass from one compartment to another. Such structure permits the ready control of the temperature in any of the compartments without directly affecting that in the others. For example, the temperature in compartment 41 may be raised sufficiently to insure the rapid melting of the added colorant and the temperature in the other compartments 42 and 43 may be lowered to bring the temperature of the molten glass gradually down to the desired working temperature at the outlet 15.

Electrodes 40 extend into the body of the glass in the chamber 41 and are energized in an electric circuit to provide heat throughout the width of the mass of molten glass, thereby creating convection current motion which not only mixes the glass and the colorant, but also presents greater volumes of the glass to the heat generated by the electrodes and the heat generated by the combustion burners spaced along the sidewall of the forehearth. Thus heat is applied both interiorly and exteriorly of the mass to hasten the melting of the colorant and permit a very appreciable increase in the volume of glass which passes through the coloring zone 41 in a given time interval. This combination of exterior and interior heat accentuates and accelerates the convection motion of the glass and accelerates the dispersion of the color throughout the mass.

In addition, there is provided a stirring mechanism 25 which is preferably rotated at a speed and in a direction conducive to retaining or slowing down the rate of travel of the glass through and from zone 41. Actually, the surface flow of glass through zone 41 is retarded to the extent that the colorant as added is completely melted prior to reaching the stirring device. Thus the combination of the electrodes, the combustion heating and the stirring device insures the complete and rapid melting of the added material in zone 41 and in addition this combination insures the complete homogeneity of the glass, particularly so far as color may be concerned, prior to leaving or passing beyond the stirring device 25.

Modifications may be restorted to within the spirit and scope of my invention.

I claim:

1. The combination with a glass melting and refining tank, of a forehearth extending horizontally forward therefrom and providing a channel through which molten glass from the furnace flows forwardly to a delivery orifice, a dam in said channel at the junction of the tank and forehearth adapted to accelerate the surface flow of glass into said channel, means to feed coloring material or oxides over the surface of the glass during said accelerated flow, said feeding means being positioned to feed the said coloring material or oxides to the glass at the downstream side of the dam, damper blocks spaced along the length of said channel and adapted to segregate the overhead space along the length of the channel into a plurality of temperature control zones, said zones being located forwardly from said dam and the first of said zones extending forwardly from said dam to the first of said damper blocks, combustion burners in each of said zones adapted for surface heating of the glass, electrodes extending into and beneath the glass in the first of said zones, said electrodes adapted to work in heating combination with said combustion burners, a stirring device extending horizontally across the said channel near the outer end of said first zone, the stirring device being located downstream from the said feeding means a distance greater than the width of the channel, such distance being sufficient to permit a substantial mixing of the said coloring material or oxides and the glass flowing over the dam before the stirring device is reached, and means for rotating said stirring device about a horizontal axis.

2. The combination with a glass melting and refining tank of a forehearth extending horizontally forward therefrom and providing a channel through which molten glass from the furnace flows forwardly to a delivery orifice, a dam at the entrance to said channel adapted to accelerate the surface flow of glass into said channel, means to feed coloring material over the width of the surface of the glass in said channel in close proximity to the dam during said accelerated flow, damper blocks spaced along the length of said channel and adapted to segregate the overhead space along the length of the channel into a plurality of temperature control zones, combustion burners in each of said zones adapted for surface heating of the glass, electrodes immersed in the glass and extending substantially throughout the width of said channel and beneath the surface of the glass in the first of said zones beyond the dam and adapted for combination heating with said combustion burners, a stirring device submerged in the glass and extending horizontally across the said channel near the forward end of said first zone, and means for rotating the stirring device about a horizontal axis.

3. The combination with a glass melting and refining tank, of a forehearth extending horizontally forward therefrom and providing a channel through which molten glass from the furnace flows forwardly, a stirring device extending horizontally across said channel and mounted for rotation about a horizontal axis perpendicular to the direction of flow of the glass along the channel, a motor having driving connection with the stirring device and by which the latter is rotated about said axis, said stirring device comprising stirring elements extending radially from the said axis and distributed at intervals lengthwise of said axis, the said axis being about midway between the floor of the channel and the normal surface level of the glass flowing through the channel, and the stirring elements being of such length that their paths of movement extend approximately to the channel floor and to the said surface level of the glass, means for feeding coloring material into the glass at a point between the tank and said stirring device, electrodes extending into the glass between the said feeding means and the stirring device, through which electrodes electric current is transmitted for generating heat and creating convection current motion, the stirring device being positioned in advance of the said feeding means a distance greater than the width of the channel to permit mixing of the coloring material with the glass before reaching the stirring device.

References Cited in the file of this patent

UNITED STATES PATENTS

| 1,815,473 | Harding et al. | July 21, 1931 |
| 1,868,858 | Thum | July 26, 1932 |
| 2,115,408 | Brosse | Apr. 26, 1938 |
| 2,593,197 | Rough | Apr. 15, 1952 |

FOREIGN PATENTS

| 41,254 | France | Aug. 30, 1932 |